Figure 1:
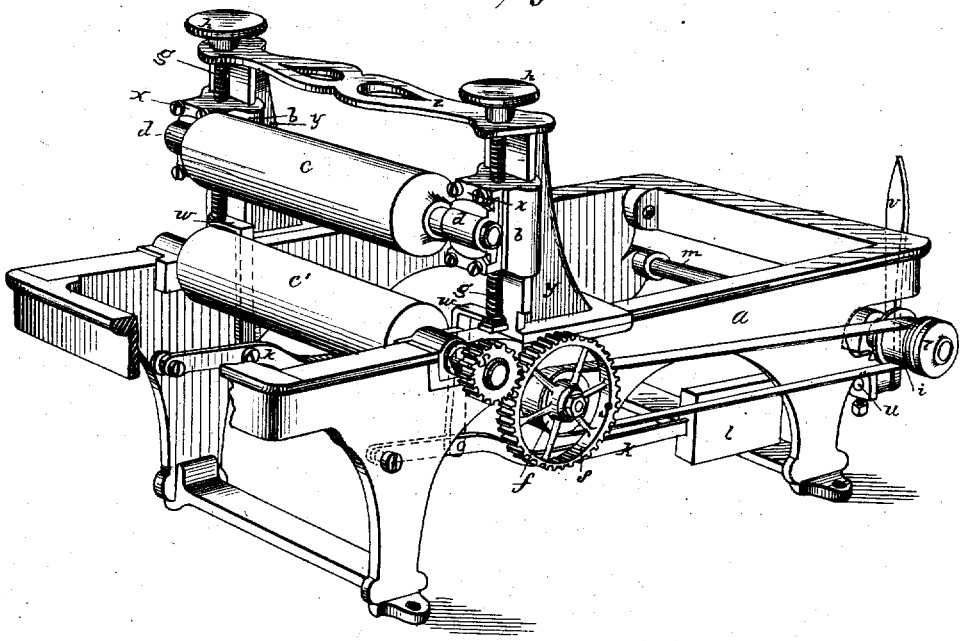

J. RICHARDS.

Assignor to J. A. FAY & Co.

Wood-Planing Machine.

No. 8,297. Reissued June 25, 1878.

Witnesses:
H. D. Perrine
Chas. H. Neale

John Richards
Inventor.
Wm. H. Donne,
President of J. A. Fay & Co.
Assignee
by his attorney
C. E. Gill

N. PETERS, PHOTO-LITHOGRAPHER, WASHINGTON, D. C.

UNITED STATES PATENT OFFICE.

J. A. FAY & CO., OF CINCINNATI, OHIO, ASSIGNEES OF JOHN RICHARDS.

IMPROVEMENT IN WOOD-PLANING MACHINES.

Specification forming part of Letters Patent No. 103,080, dated May 17, 1870; Reissue No. 8,297, dated June 25, 1878; application filed June 7, 1878.

*To all whom it may concern:*

Be it known that JOHN RICHARDS, of the city and county of Philadelphia, and State of Pennsylvania, did invent certain new and useful Improvements in Planing-Machines for Planing Wood, of which the following is a full, clear, and exact description.

This invention was contrived more especially with a view to improve planing-machines for planing wood, and the ensuing description deals specifically with the invention as applied to such planing-machines, although it will be at once perceived by any person skilled in the art to which it appertains that some of the features of the invention are adapted for use in various connections with other machines, and particularly other wood-working machines.

The invention relates, first, to the means for driving, stopping, and starting a pulley, (in this instance the pulley which transmits motion to the feed-rolls through belt and cog gearing;) and this feature consists of certain combinations and arrangements of a friction-driver, a sleeve or sliding bearing for forcing the sliding part of the friction-driver up into frictional contact with the fixed part thereof, and a shaft for operating the sleeve or sliding bearing.

In order to show the utility of these improvements as here applied, it may be explained that in planing-machines of this kind, where rolls are employed to feed the lumber through the machine, the motion of these feed-rolls is slow, and great force is required to feed under the resistance of the pressure-guards, and that such feed-rolls are usually connected with the driving or other shaft of the machine by a train of gearing properly arranged and proportioned to give the proper speed and force to the rolls, as will be readily understood by those skilled in making such machines. The first mover in this train of gearing is usually driven by a belt, and the feed-motion engaged and disengaged by a positive clutch. The motion of this first mover being rapid, there is constant danger of breaking the teeth of the wheels and injuring and wearing the parts by concussion. These objections are avoided by the use of a friction-driver, which will start the feed-rolls gradually, and will slip so as to allow the rolls to stop to prevent injury to the machine in case the lumber meets with any obstruction in its passage through it, or in case any other accident happens to the machine which requires the immediate stoppage of the feed-rolls or feed-gearing to obviate the breaking of any parts.

The invention relates, secondly, to the mode of supporting and adjusting the yielding feed-roll of planing-machines; and this feature consists of the combination, with the vertically-adjustable carriers for such feed-roll, of circularly-adjustable boxes or bearings for the journals thereof, which boxes will adapt themselves automatically to oblique positions which the roll may assume in accommodating itself to the inequalities of the lumber fed through the machine.

The invention relates, thirdly, to the mode of connecting the weighted levers with the yielding feed-roll; and this feature consists in connecting such levers to the adjusting-screws of said roll by means of links pivoted to the levers and swiveled to the adjusting-screws.

Figure 2:
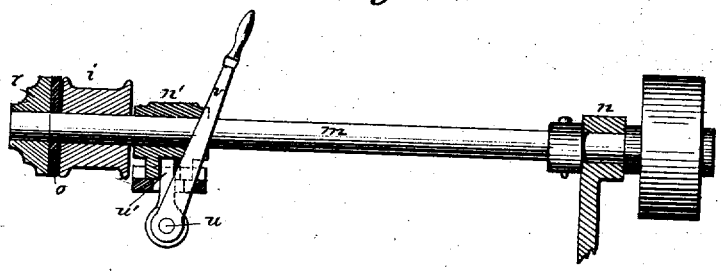

In the accompanying drawings, Figure 1 is a perspective view of so much of a wood-planing machine as requires to be shown in order to illustrate the several features of the invention. Fig. 2 is a detail view, showing the driving-shaft of the machine, together with one form of embodiment of the first part of the invention.

The same letters of reference are used in all the figures in the designation of identical parts.

*a* refers to the main frame of the machine; *c* and *c'* to the feed-rolls, the lower one of which turns in fixed stationary bearings, and is connected, by spur-gearing *s s*, to the shaft of pulley *f*, which is driven by means of a belt from a pulley, *i*, placed, in this instance, on the driving-shaft *m* of the machine. As the driving-shaft, which is supported by bearings *n n'*, rotates continuously when the machine is at work, and the pulley *i* requires to stand still at times, it is mounted to turn loosely on said shaft, and motion is transmitted to it therefrom by means of a friction-driver.

By reason of the fact that the pulley *i* to be driven is mounted on the shaft which carries the driving part of the friction-driver, this friction-driver is here a friction-clutch, whereas, in the event of mounting pulley *i* on a separate shaft not in line with the driving-shaft, the friction-driver would necessarily assume the form of friction-gearing. The driving part or disk *r* of the friction-driver is keyed to driving-shaft *m*, while the driven part of the friction-driver is the adjacent side of pulley *i*, on which the driving-disk *r* operates through a washer, *o*, of leather, wood, or other suitable material.

To start pulley *i*, it is pressed toward disk *r* to establish frictional contact therewith through the washer *o*. This is accomplished by means of the sliding bearing *n'* of the driving-shaft, which bearing is mounted on fixed guides or ways on the main frame in close proximity to pulley *i*, as clearly shown in the drawing, and thus subserves the twofold purpose of giving support to a shaft, and of moving the shiftable part of the friction-driver up against the fixed part thereof. This sliding bearing is moved as required by rocking a shaft, *u*, which is supported in bearings below the sliding bearing *n'*, and has an arm, *u'*, engaging the said sliding bearing. This shaft is provided with a hand-lever, *v*, for rocking it. In holding the pulley *i* in frictional contact with the driving part of the friction-driver by the sliding bearing *n'*, the shaft *u* will be under torsional strain sufficient to give the driving part of the friction-driver the required tractive power over the driven part. The torsional quality of the shaft *u* enables it to yield to any undue strains on the feed-rolls or feed-gearing, so as to allow the driving part of the friction-driver to slip on the driven part, while the frictional contact remains preserved, inequalities in the frictional surfaces being compensated for by the torsion of shaft *u*.

The upper or yielding feed-roll *c* turns with its journals in boxes *d*, which have circular flanges fitted loosely under the gib-pieces *x x* on the carriers *b*, so that said boxes may turn or swivel to accommodate themselves to the journals of the yielding feed-roll in case it assumes oblique positions, as in feeding lumber of uneven thickness in cross-section. The carriers *b* are fitted to slide on vertical ways of the standards *y*, and are moved up and down by the screws *g*, which are suspended by their heads from the cross-piece *z* of the standards *y*, and pass through screw-threaded holes in the carriers. These screws are provided with hand-wheels *h*, for convenience in turning them when the carriers *b* require to be adjusted. The screws are adapted to rise through the holes in the cross-piece *z*, and their lower ends are swiveled to the upper ends of links *w*, which connect the screws to the respective levers *k*, carrying weights *l*.

It will be observed that the adjustment of the yielding feed-roll by the screws *g* has no effect on the weighted levers *k*, which come into play only when lumber is fed through the machine, and the yielding feed-roll is lifted thereby, so as to push up the screws *g* through cross-piece *z*.

What is claimed as the invention of the said JOHN RICHARDS is—

1. The combination, substantially as specified, of a friction-driver and the torsional shifter-shaft .

2. The combination, substantially as specified, of a driving-shaft, a pulley to receive motion therefrom, a friction-driver for transmitting motion from the shaft to the pulley, and a shiftable shaft-supporting bearing.

3. The combination, substantially as specified, of a driving-shaft, a pulley to receive motion therefrom, a friction-driver for transmitting motion from the shaft to the pulley, a shiftable shaft-supporting bearing, and the torsional shifter-shaft.

4. In a machine for planing wood, the combination, substantially as specified, of the driving-shaft, a pulley loosely mounted on said shaft, a friction-clutch for transmitting motion from the shaft to the pulley, and a movable bearing of the shaft adapted to force the shiftable part of the clutch up into frictional contact with the fixed part thereof.

5. In a machine for planing wood, the combination, substantially as specified, of the driving-shaft, a pulley loosely mounted on said shaft, a friction-clutch for transmitting motion from the shaft to the pulley, a movable bearing of the shaft, and the torsional shifter-shaft.

6. The radial friction-plates *r i*, with the friction-washer *o*, constructed as described, in combination with the movable bearing *n'*.

7. The sliding carriers *b b'*, when provided with the adjustable bearings *d d*, constructed as shown, for the purposes specified.

8. The levers *k k*, connected directly to the adjusting-screws *g g* by means of links *w w*, with a swivel-joint, substantially in the manner and for the purposes herein specified.

W. H. DOANE,
*President of J. A. Fay & Co.,*
*Assignees of John Richards.*

Witnesses:
CHAS. G. JONES,
ALBERT N. SPENCER.